(12) United States Patent
Evans

(10) Patent No.: US 7,480,113 B2
(45) Date of Patent: Jan. 20, 2009

(54) TAPE DRIVE APPARATUS

(75) Inventor: Nigel Ronald Evans, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/835,869

(22) Filed: Aug. 8, 2007

(65) Prior Publication Data

US 2008/0007867 A1    Jan. 10, 2008

Related U.S. Application Data

(62) Division of application No. 11/238,228, filed on Sep. 29, 2005.

(30) Foreign Application Priority Data

Oct. 14, 2004    (GB)    ................. 0422828.4

(51) Int. Cl.
*G11B 19/02*    (2006.01)
(52) U.S. Cl. ........................................ 360/69
(58) Field of Classification Search ........... None
See application file for complete search history.

(56) References Cited

U.S. PATENT DOCUMENTS

| | | | |
|---|---|---|---|
| 5,652,742 A * | 7/1997 | Baca et al. | 369/30.31 |
| 6,025,967 A | 2/2000 | Kuta et al. | |
| 6,216,057 B1 * | 4/2001 | Jesionowski | 700/214 |
| 6,243,332 B1 * | 6/2001 | Dimitri et al. | 369/30.31 |
| 6,611,394 B1 | 8/2003 | Kato et al. | |
| 6,762,898 B2 | 7/2004 | Azuma | |
| 6,918,554 B2 | 7/2005 | Stamm et al. | |
| 2004/0190179 A1 * | 9/2004 | Kato et al. | 360/69 |
| 2004/0254647 A1 * | 12/2004 | Johnson et al. | 700/1 |
| 2005/0018342 A1 | 1/2005 | Kato et al. | |

FOREIGN PATENT DOCUMENTS

| | | |
|---|---|---|
| EP | 0962866 | 12/1999 |
| JP | 2002208217 | 7/2002 |

OTHER PUBLICATIONS

International Search Report dated Nov. 29, 2004 for Application No. GB0422828.4

* cited by examiner

*Primary Examiner*—Andrew L Sniezek (57) ABSTRACT

A tape drive apparatus has a data transfer apparatus for transferring data between a loaded tape medium and the tape drive apparatus. A data processing apparatus is coupled to the data transfer apparatus for formatting the loaded tape medium. The formatting of the tape medium is performed using an identifier of the tape medium. For example, the identifier is written together with the formatting information onto the tape medium for later reference.

20 Claims, 7 Drawing Sheets

TAPE DRIVE APPARATUS

CROSS-REFERENCE TO RELATED APPLICATION

This application is a divisional of copending U.S. utility application entitled, "Tape Drive Apparatus," having Ser. No. 11/238,228, filed Sep. 29, 2005, which is entirely incorporated herein by reference and which claims priority to UK application entitled "Tape Drive Apparatus," having serial no. 0422828.4, filed Oct. 14, 2004.

FIELD OF THE INVENTION

The present invention generally relates to the field of magnetic tape media.

BACKGROUND AND PRIOR ART

For decades information has been stored on magnetic tape medium using tape drives. Initially the magnetic tapes were wound about large reels in similar manner as film for early film projectors. In more recent years the magnetic tape has typically been housed in a cartridge or cassette, extending internally in the cartridge from a supply reef to a take-up reel. In these cartridge applications, typically a leader tape attaches to the reel. A splicing tape then connects the leader to the magnetic tape, which in turn wraps around the reel. Cartridges may contain a supply reel only, or a supply reel and take up reel.

In some systems, the magnetic tape has longitudinal tracks recorded thereon (e.g., tracks that extend along the major length dimension of the tape). In other systems, the path of the magnetic tape is such that the tape is at least partially wrapped around a drum in a manner to transduce helical stripes or tracks on the magnetic tape. Some of the cartridges have a lid or the like which is displaced upon insertion of the cartridge into the tape drive, thereby exposing the magnetic tape to operative elements of the tape drive (e.g., tape guides, tape transport mechanisms, and transducing elements). Other cartridges are fabricated with a window or the like into which operative elements of the tape drive extend when the cartridge is loaded into the tape drive.

Some prior art techniques have been developed whereby, upon insertion into a tape drive, the tape/cartridge is identified as being of a certain type.

U.S. Pat. No. 6,385,001 shows a tape medium that has a transparent identification window segment. The identification window segment has a length that is chosen to provide a predetermined medium or cartridge signature when the medium is transported at a selected linear velocity.

GB2266402A discloses a tape medium having a transparent splice or splicing tape that has at least one opaque stripe located on it over the leader tape for automatic recognition of its tape format. The tape drive has circuitry for finding the junction of the data storage portion of the tape medium and the leader tape by monitoring the output signal of an optical sensor. When toggling of the sensor output signal is detected this indicates that the opaque stripe is present and that the cassette is intended for storage of data.

The standard ECMA-288, June 1999, that is available from http://www.ecma.ch shows a corresponding medium recognition system (MRS) in its chapter 9.16. In accordance with this standard a pattern of alternating clear and opaque stripes shall exist along the entire length of the splicing tape at the physical beginning of the tape, i.e. where the leader tape is joined to the magnetic tape. The light transmittance through the combination of the opaque stripes and the leader tape shall be 5% max. The light transmittance through the combination of the clear stripes and leader tape shall be 60% minimum. Annex B of the standard ECMA-288 shows the general principle of measuring equipment and a measuring method for measuring the light transmittance of the tape.

SUMMARY OF THE INVENTION

In accordance with the present invention there is provided a tape drive apparatus comprising a data transfer apparatus for transferring data between the loaded tape medium and the tape drive apparatus. A data processing apparatus is coupled to the data transfer apparatus for formatting the loaded tape medium. The data processing apparatus uses a tape medium identifier for formatting the tape medium.

In accordance with an embodiment of the invention a tape drive apparatus has a counter that changes its counter value each time the tape drive apparatus performs a formatting operation. For example, the counter is incremented or decremented with each formatting operation. The counter value is used by the data processing apparatus for defining the tape medium identifier.

In accordance with an embodiment of the invention the tape drive apparatus has a non-volatile memory for storing a tape drive identifier (ID) such as a vendor ID, a product ID and/or a drive serial number. The data processing apparatus uses one or more such tape drive identifiers for defining the unique tape medium identifier.

In accordance with an embodiment of the invention the tape drive apparatus has a reader for reading cartridge media format information. Such cartridge media format information can be encoded by means of so called recognition holes, e.g. as defined in the ECMA-288 standard. The cartridge media format information is used by the data processing apparatus for defining the tape medium identifier.

In accordance with an embodiment of the invention the tape drive apparatus has an optical reader for reading a pattern from the tape. For example, the pattern is a bar code that is positioned on a leader and/or trailer portion of the tape. The bar code can carry various kinds of information, such as an identifier of the tape medium's manufacturer, tape format information including format generation, and/or other kinds of information. The information carried by the pattern is decoded and provided to the data processing apparatus. The data processing apparatus uses the decoded pattern information for defining the tape medium identifier.

In accordance with an embodiment of the invention the formatting of the tape medium is performed by defining fragments on the tape. For a digital data storage (DDS) tape medium this is done by defining 384 fragments per track in the DAT 160 format. Each fragment has a fragment number, e.g. the fragments are numbered from 0 to 383. Each fragment has a data portion for receiving user data and a header portion for storing various control information. Preferably the header portion of at least some of the fragments are used to write the tape medium identifier as part of the tape medium formatting information. For example, the tape medium identifier is written to the header portions of at least a sub-set of the fragments of the reference area of the tape medium. The reference area is a portion of the tape medium that serves for writing formatting information. Preferably the reference area is located near the physical beginning of the tape medium.

In accordance with an embodiment of the invention the formatting of the tape medium comprises writing fragments to the reference area of the tape medium. The tape medium identifier is written into at least some of the fragments of the reference area.

In accordance with an embodiment of the invention the set of fragments of a track has at least first and second sub-sets. The first sub-set of the fragments serves for storage of a first portion of the tape medium identifier and the second sub-set of the fragments serves to store a second portion of the tape medium identifier.

In accordance with an embodiment of the invention the at least first and second sub-sets are identified using a modulus criterion. For example, the first portion of the tape medium identifier is stored in the headers of all fragments that have the same modulus of their fragment numbers. Likewise the second portion of the unique tape medium identifier is stored in all headers of the fragments that have another modulus of their fragment numbers.

In accordance with an embodiment of the invention the data processing apparatus can receive a reformat command from a host computer. In response to the reformat command the tape medium identifier is read from the tape medium. This unique tape medium identifier is re-used for performing the reformatting operation such that the tape medium identifier remains unchanged despite the reformatting.

In another aspect the present invention relates to a tape drive apparatus that has a data transfer apparatus for transferring data between a loaded tape medium and the tape drive apparatus and a data processing apparatus being coupled to the data transfer apparatus for reading the tape medium identifier from the tape medium.

For example the tape medium identifier can be used locally by the tape drive apparatus such as for generating an event log and/or the tape medium identifier can be provided from the tape drive apparatus to a backup application program or a tape library controller.

In another aspect the present invention relates to a library for storing and retrieving removable information storage elements. The removable information storage elements have non-volatile memories for storing format information comprising a unique information storage element identifier. The library has an array of storage cells for storing the removable information storage elements and at least one drive for reading information from the removable information storage elements. An accessor is used for transporting the removable information storage elements between the storage cells and the at least one drive. The at least one drive can read the format information from the tape medium. The controller of the library is operable to direct the accessor to move one of the removable information storage elements from its storage cell to the at least one drive, direct the data reader apparatus to read the unique identifier from the non-volatile memory of the one of the removable information storage elements, and enter the unique information storage element identifier into a cartridge map.

In accordance with an embodiment of the invention the controller of the library is operable to inventory the array of storage cells by directing the accessor and the at least one drive to sequentially read all the unique information storage element identifiers of the removable information storage elements stored in the array. As a result a cartridge map is provided that maintains information on where the removable information storage elements are located in the array.

BRIEF DESCRIPTION OF THE DRAWINGS

In the following embodiments of the invention will be described, by way of example only, and with reference to the drawings in which.

DETAILED DESCRIPTION

Figure 1:
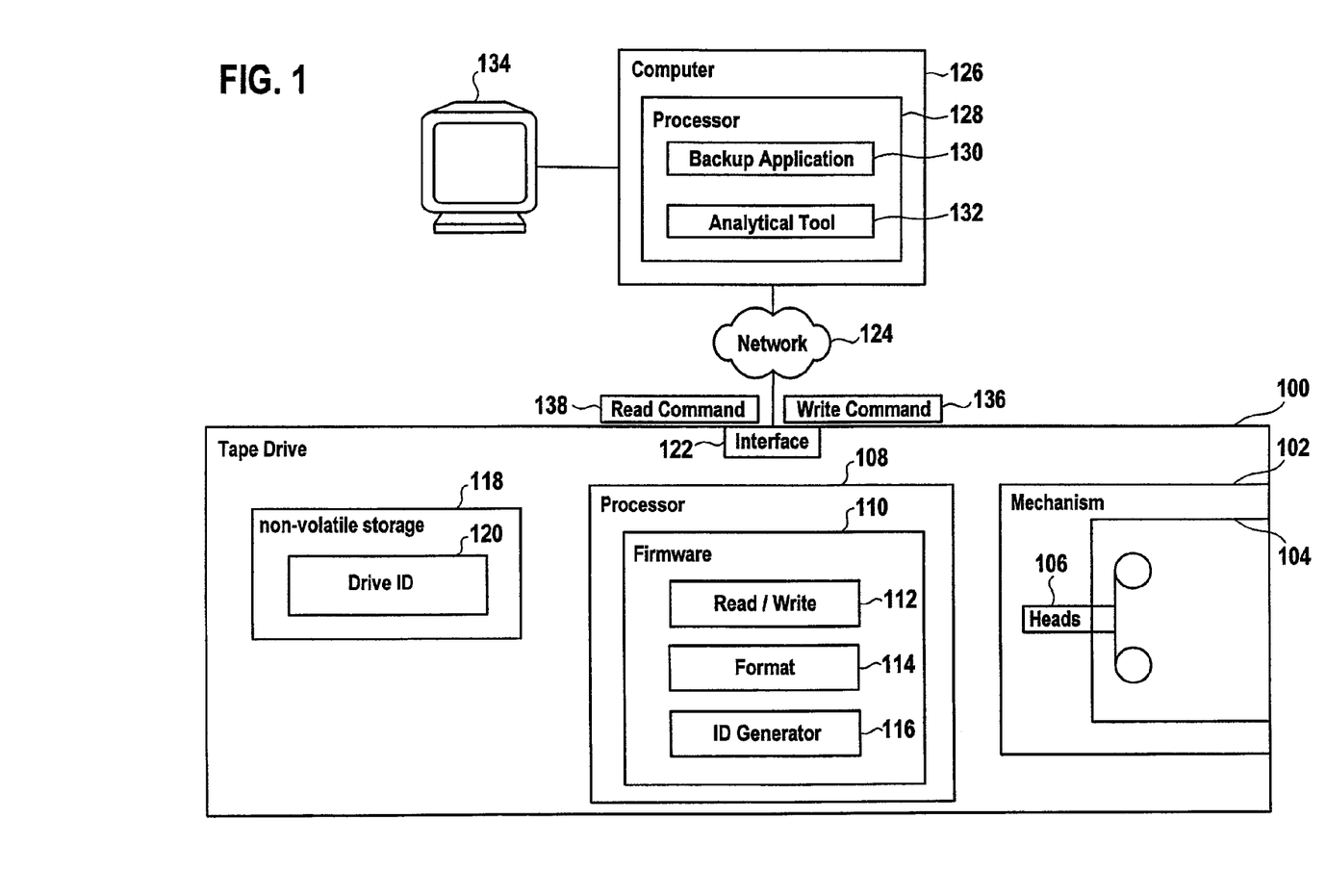
FIG. 1 Is a schematic block diagram showing a first embodiment of a tape drive apparatus, FIG. 2 Is a fragmentary view of a formatted tape medium, FIG. 3 Is a flow diagram illustrating the steps involved in formatting a tape medium, FIG. 4 Is a schematic block diagram showing an alternative embodiment of the tape drive, FIG. 5 Is a flow diagram illustrating steps involved in formatting a tape medium with the tape drive of FIG. 4, FIG. 6 Is a fragmentary view of an embodiment of the tape medium, FIG. 7 Is a fragmentary view of a second embodiment of the tape medium, FIG. 8 Is a block diagram of a library.

FIG. 1 shows a tape drive 100 having a tape drive mechanism 102 which loads and ejects tape medium 104 and winds the tape medium 104 forwards or backwards as required for reading and writing data. In a DDS (Digital Data Storage) tape drive the read/write heads 106 are mounted on a helical scanning drum, which rotates to sweep the heads past the tape in a motion oblique to the direction of travel of the tape.

The processor 108 of the tape drive 100 serves to execute firmware 110. Firmware 110 comprises instructions 112 for transferring data between the loaded tape medium 104 and the tape drive 100. Further, the firmware 110 comprises instructions 114 for formatting the tape medium 104 and instructions 116 for defining an identifier for the tape medium 104.

Tape drive 100 has a non-volatile storage 118 for storing data 120. For example, the data 120 is a unique drive ID of the tape drive 100 or another unique identifier of the tape drive 100. The data 120 is used by the instructions 116 for defining an identifier for the tape medium 104.

The tape drive 100 has an interface 122 for establishing a communication link with a computer 126 via a network 124. The computer 126 has a processor 128 for running a backup application program 130 and an analytical program tool 132. A monitor 134 is coupled to the computer 126.

In operation tape medium 104 is loaded by a tape mechanism 102. This invokes the instructions 114. The instructions 114 operate the heads 106 in order to determine whether the tape medium is formatted or unformatted. If the tape medium 104 is already formatted the instructions 112 can execute write command 136 or a read command 138 which the tape drive 100 has received from the backup application program 130 at its interface 122.

When the tape medium 104 is unformatted, the instructions 114 invoke the instructions 116 for definition of an identifier of the tape medium 104 that unequivocally identifies the tape medium 104 within a set of tape media. This can be done by reading a pattern from the tape medium 104, e.g. the tape cartridge and/or the tape, decoding the pattern and using the decoded pattern for defining the tape medium identifier. The pattern can be e.g. in, on or attached to the tape medium 104; for example a pattern can be formed by holes in the tape medium and/or by optically readable patterns on the tape. In particular, it is to be noted that optical tape technologies can be used for implementing the pattern.

In addition to the decoded pattern other information can be used for defining the tape medium identifier. In the embodiment considered here the instructions 116 read the data 120 from the non-volatile storage 118 and use the data 120 for the definition of the identifier of the tape medium 104. This can be done by combining the data 120 with a counter value delivered by a counter (not shown in FIG. 1) of the tape drive 100. For example, the counter has a counter value that is incremented each time the tape drive apparatus performs a formatting operation. If the tape drive 100 has a clock, the actual time value can also be utilised for definition of the identifier of the tape medium 104.

After definition of the unique identifier of the tape medium 104, the instructions 114 perform a formatting operation on the tape medium 104. The formatting of the tape medium 104 involves the definition of fragments. Each fragment has a data portion for receiving user data and a control portion such as a header or trailer for receiving control and/or formatting information. The instructions 114 write the identifier or portions of the identifier into at least a sub-set of the control portions of the fragments. Preferably only fragments on a certain portion of the tape medium are written when the tape medium is formatted. For example, the control portions of at least some the fragments that are located within the reference area of the tape are used for writing the identifier. The user portions of the fragments within the reference area are typically not used for writing user data.

Figure 2:
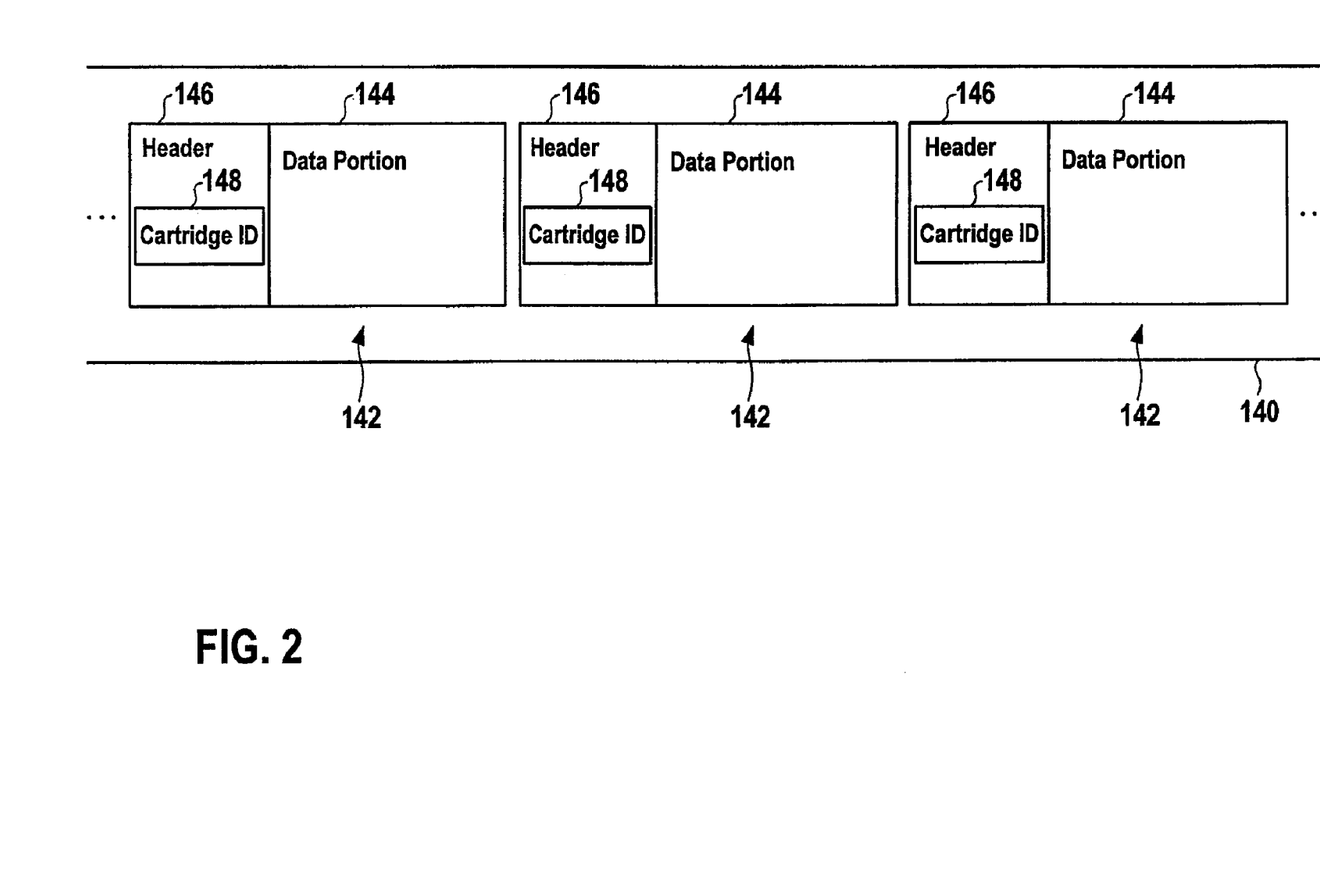

FIG. 2 schematically shows a track 140 that is defined on the tape medium 104 by the formatting operation. The track 140 comprises a number of fragments 142. Each fragment 142 has a data portion 144 for receiving user data and a header portion 146 for receiving various control and formatting data. The unique identifier of the tape medium 104 is written as cartridge ID 148 into the header portions 146 of the fragments 142.

In the example considered here the complete cartridge ID 148 is written into all header portions 146 of the fragments 142 of the track 140. It is important to note that this is not essential but that a sub-set of the fragments 142 of the track 140 can be defined whereby all the header portions 146 of the fragments 142 of the sub-set receive the cartridge ID 148.

As a further alternative at least first and second sub-sets of the fragments 142 are defined. In this instance the cartridge ID 148 is split into portions that are written into the header portions 146. For example, the cartridge ID 148 is split into a first and a second string. The first string is stored in the header portions 146 of the fragments 142 of the first sub-set and the second string is stored in the header portions 146 of the fragments 142 of the second sub-set.

Preferably only the fragments within the reference area of the tape medium are used for receiving the identifier. The fragments within in the reference area may or may not be used for writing user data into the data portions 144. Preferably the data portions of these fragments are not used for writing user data but are filled with zeros. Alternatively the content of the data portions 144 is "don't care".

Figure 3:
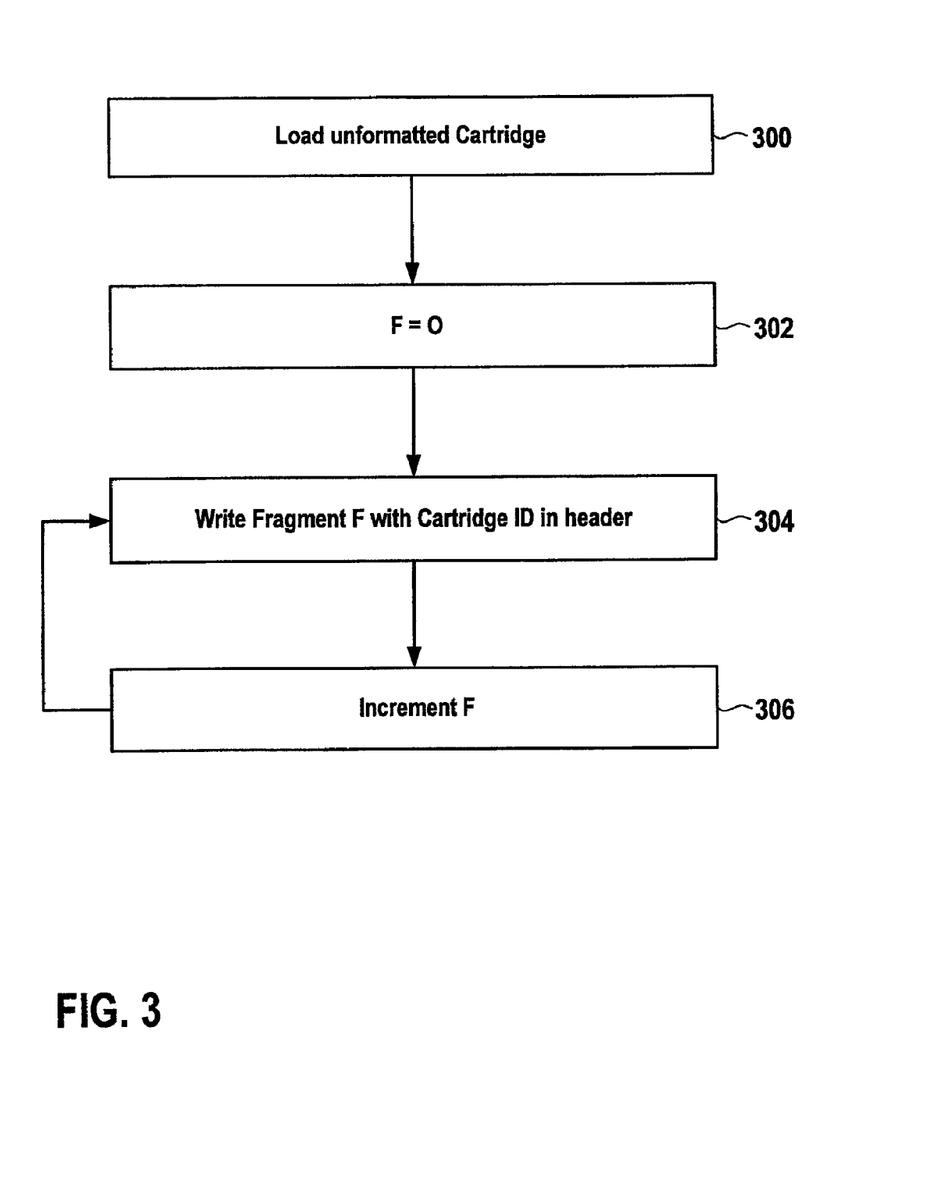

FIG. 3 illustrates a mode of operation of the tape drive 100 of FIG. 1.

In step 300 an unformatted tape cartridge is loaded by the tape mechanism. In step 302 a fragment index F of the fragments is set to F=0. In step 304 the first fragment F is written onto the tape with the cartridge ID in the fragment's header. In step 306 the index F is incremented and the control goes back to step 304.

Figure 4:
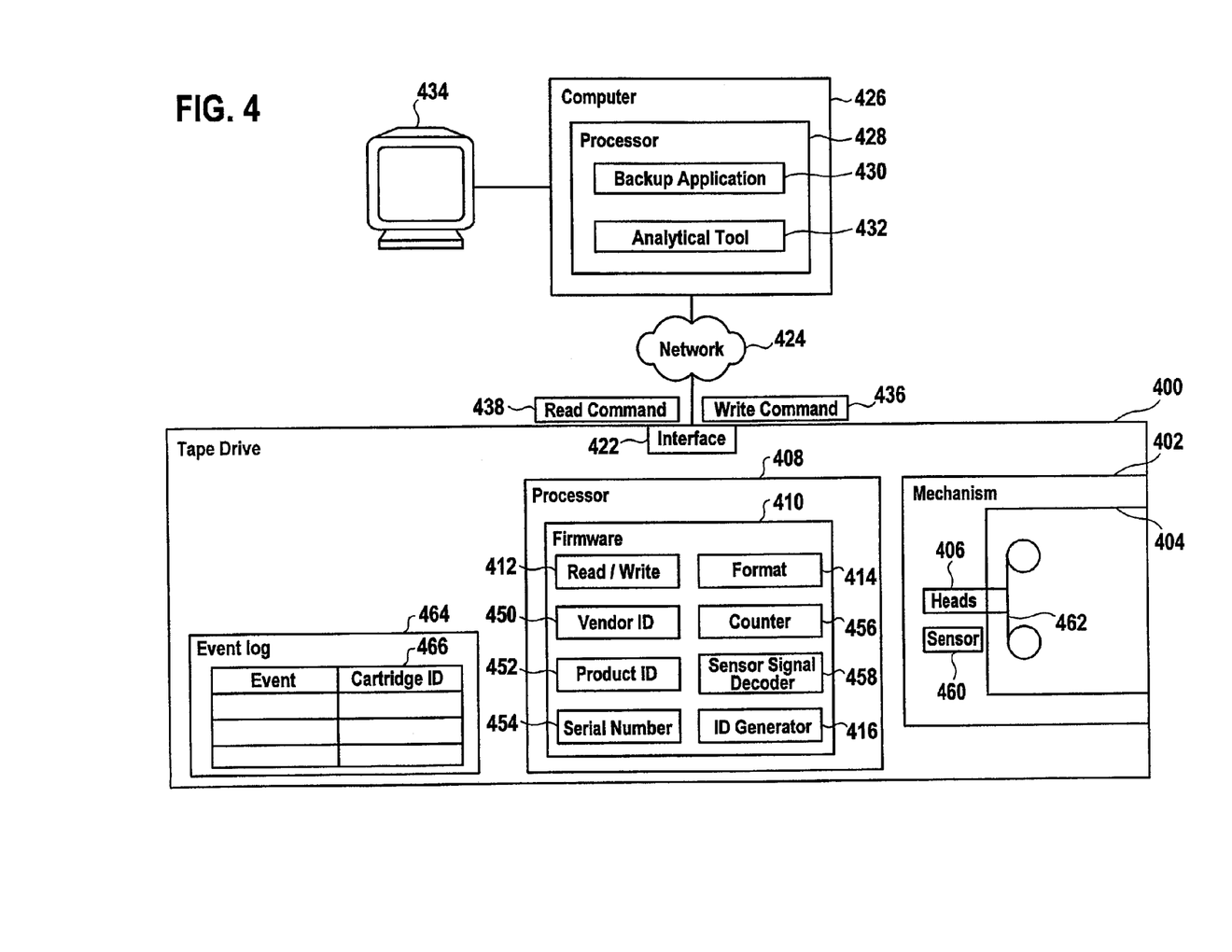

FIG. 4 shows an alternative embodiment of the tape drive. Elements of the embodiment of FIG. 4 that correspond to elements of the embodiment of FIG. 1 are designated by like reference numerals.

In the preferred embodiment considered here a vendor ID 450, a product ID 452 and a serial number 454 are embedded in the firmware 410. The firmware 410 provides non-volatile storage of the vendor ID 450, the product ID 452 and the serial number 454.

The instructions 456 of the firmware 410 implement a counter that provides a counter value. The counter is incremented each time the instructions 414 perform a tape formatting operation.

The instructions 458 implement a sensor signal decoder of a sensor signal delivered by a sensor 460. The sensor 460 can be a mechanical sensor for sensing the recognition holes of the cartridge of tape medium 104 or it can be an optical sensor 460, such as a barcode reader, for reading an optical pattern attached to the tape 462 of the tape medium 404. Both the recognition holes are read and decoded for reading the cartridge media format and/or the optical pattern is read to provide a cartridge pattern code. The instructions 416 use the vendor ID 450, the product ID 452, the serial number 454, the counter value provided by the instructions 456, the cartridge media format and/or the cartridge pattern code for defining an identifier for the tape medium 104.

Further, the tape drive 400 has an event log 464 for generating an event table 466. The event table 466 has an entry for each recorded event. Each log entry comprises the cartridge ID, i.e. the identifier, of the tape medium to which the recorded event is related.

Preferably the instructions 414 perform the formatting by defining tracks on the tape 462 that are oblique to a direction of travel of the tape 462 past the heads 406. Each track has a predefined number of fragments such as 384 fragments. Each fragment has a fragment number. In other words, each track of the tape 462 has 384 fragments running from fragment number 0 to fragment number 383.

The instructions 414 define four sub-sets of the fragments of each track by calculating the modulus of the fragment numbers. Fragments that belong to one of the sub-sets receive a portion of the identifier of the tape medium 104.

In the preferred embodiment considered here, the identifier is composed of the following components:
vendor ID,
product ID,
serial number,
cartridge format code (obtained from the recognition holes),
cartridge pattern code (obtained from the optically readable pattern),
the counter value.

Four sub-sets of the fragments are defined for storing the various components of the identifier of the tape medium 104. Preferably the following definition is used:

$$\mod 16\{F\} = \begin{cases} 0 \Rightarrow \textit{VendorID, ProductID}, \text{Characters\_9\_and\_10\_of\_Serial\_Number} \\ 1 \Rightarrow \text{Characters\_5\_to\_8\_of\_Serial\_Number} \\ 2 \Rightarrow \text{Characters\_1\_to\_4\_of\_Serial\_Number} \\ 3 \Rightarrow \textit{CartridgePatternCode, CartridgeFormatCode}, \text{counter\_value} \end{cases}$$

where mod is the modulus operator and F is the fragment number. In the example considered here the modulus 16 is calculated. The modulus 16 operator divides F by 16 and returns only the result of the division.

If the modulus 16 of F is 0 the respective fragment belongs to the first sub-set of fragments and the vendor ID, product ID and the characters 9 and 10 of the 10 character serial number are stored in the header portion of this fragment. If the modulus 16 of the fragment number F is 1 the characters 5 to 8 of the serial number are stored in the header portion of that fragment and if the modulus 16 of the fragment number F is 2 the characters 1 to 4 of the serial number are stored in the header portion. If the modulus 16 of the fragment number F is 3 the cartridge pattern code, the cartridge format code and the counter value are stored in the header portion of that fragment.

After formatting the tape medium 404 the instructions 412 can execute write commands 436 and read commands 438. For example, in case of a failed write or read command a corresponding event entry is created and entered into the event table 466 by the instructions 412. The identifier, i.e. the cartridge ID, of the tape medium 404 is read from the header portions of the fragments stored on the tape 462 and is written to the event table 466 as part of the event entry. In the embodiment considered here the cartridge ID is composed of the Vendor ID, Product ID, serial number, cartridge format code, cartridge pattern code, and the counter value. These components are concatenated in a predefined order which provides the cartridge ID that is written into the event log 464.

The event log 464 can be exported from the tape drive 400 from its interface 422 for transmission over the network 424 and analysis by the analytical tool 432. The analytical tool 432 can be used for the purpose of a statistical failure analysis using the event table 466 as a statistical basis. A result of the analysis can be outputted on the monitor 434.

Figure 5:
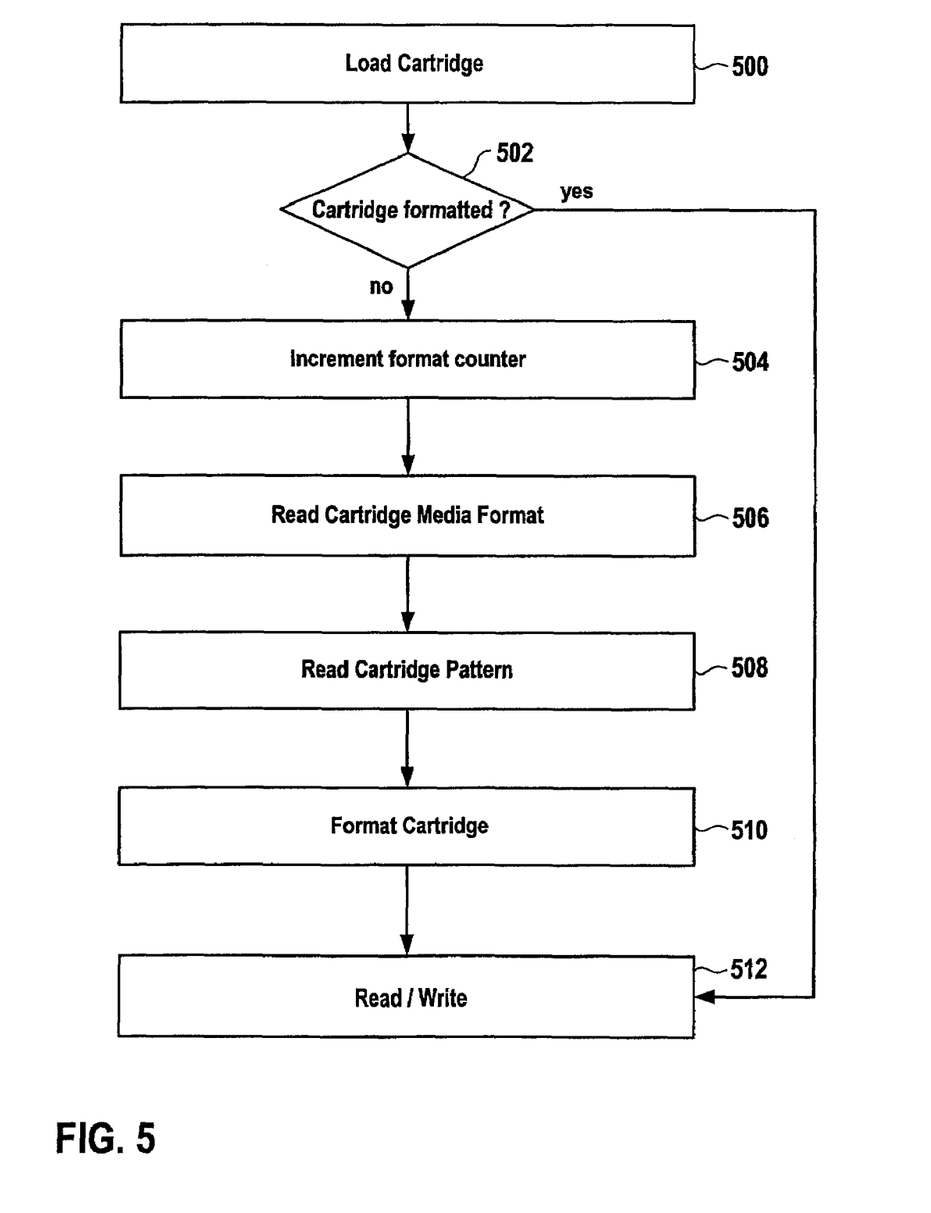

FIG. 5 shows a corresponding flowchart. In step 500 a tape cartridge is loaded by the tape mechanism. In step 502 the tape drive determines whether the tape cartridge is already formatted. If the tape cartridge is unformatted the control goes to step 504 in order to increment the format counter.

In step 506 the cartridge media format is read from the cartridges recognition holes. In step 508 the cartridge pattern code is read by optically reading the pattern that is located on the leader or trailer portion of the tape. Further, the vendor ID, the product ID and drive serial number are read from the tape drive's firmware. This results in a definition of the cartridge ID of the tape medium which is used to format the tape medium (step 510) by writing the cartridge ID or portions of the cartridge ID to at least a sub set of the fragments. After the formatting is complete read and write commands can be executed by the tape drive in step 512.

Figure 6:
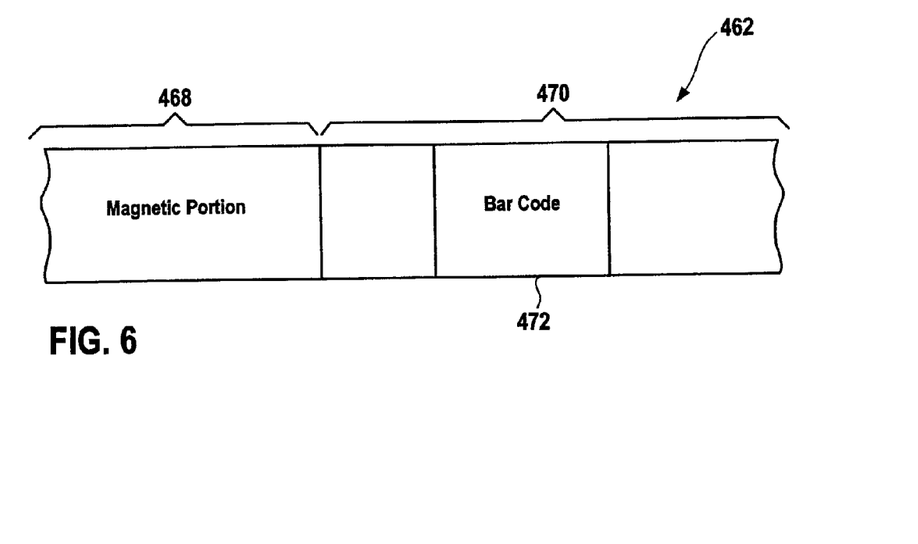

FIG. 6 illustrates and example of an optically readable pattern that is attached to the tape 462. The tape 462 has a magnetic portion 468 that has a magnetic tape coating for magnetically storing information. The tape 462 has an end portion 470. In the preferred embodiment considered here the end portion 470 is an optically transparent tape leader of the tape 462.

The end portion 470 has a barcode 472. The barcode 472 can carry various types of information regarding the tape 462 or the tape cartridge that houses the tape 462. Examples for the information contained in the barcode 472 include the format generation of the tape medium 404, the manufacturer, serial number and/or another property of the tape medium 404, such as its tape thickness, magnetic coating formulation and/or whether the tape medium 404 is pre-recorded or not. As an alternative, or in addition, the information carried by the barcode 472 relates to the tape cartridge, such as the tape cartridge format generation and/or to properties of the tape cartridge assembly including the tape medium plus the reel and shell used to house tape medium.

Figure 7:
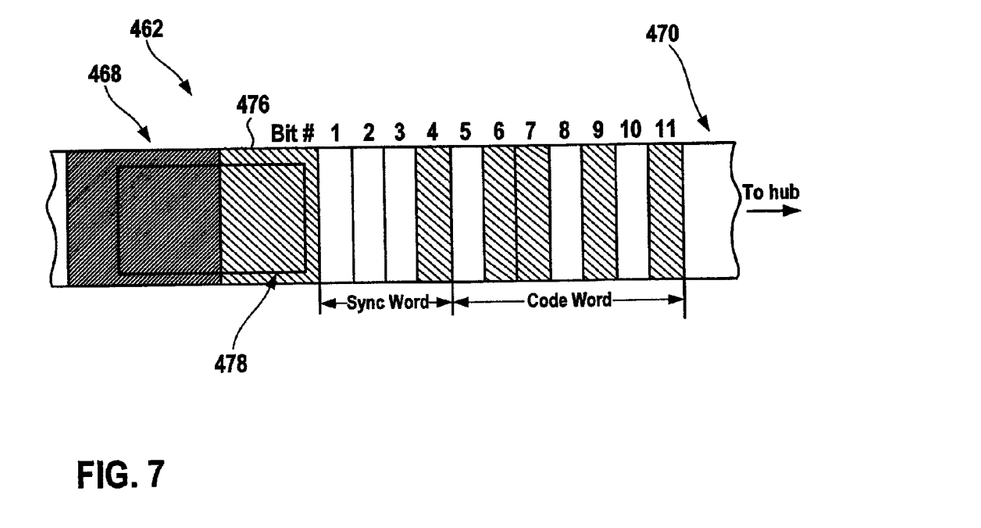

FIG. 7 shows an alternative embodiment of an optically readable pattern attached to the tape 462. As shown in FIG. 7 the tape 462 has a splicing tape 478 that joins the magnetic portion 468 and an end portion 470. The end portion 470 has a border portion 476. A splicing tape 478 extends into this border portion 476.

In the preferred embodiment considered here the optically readable-pattern consists of 11 bits. Bit positions 1 to 4 constitute a synchronisation word and bit positions 5 to 11 constitute a code word. A bit value of '0' is represented by a clear stripe on the respective bit position and a bit value of logically '1' is represented by an opaque stripe on the respective bit position. The synchronisation word facilitates reading of the code word by means of an optical sensor and the code word can carry various kinds of information related to the tape 462 and/or its tape cartridge.

The present embodiment is particularly advantageous as it facilitates to embed a unique tape medium identifier in the formatting information. The tape medium identifier can be used to unequivocally identify a tape medium within a set of tape media and/or to globally identify the tape medium. For example, the tape medium identifier can be used to generate an event log such as for diagnostic purposes. Another use of the tape medium identifier is for generating a cartridge map of a tape library.

Figure 8:
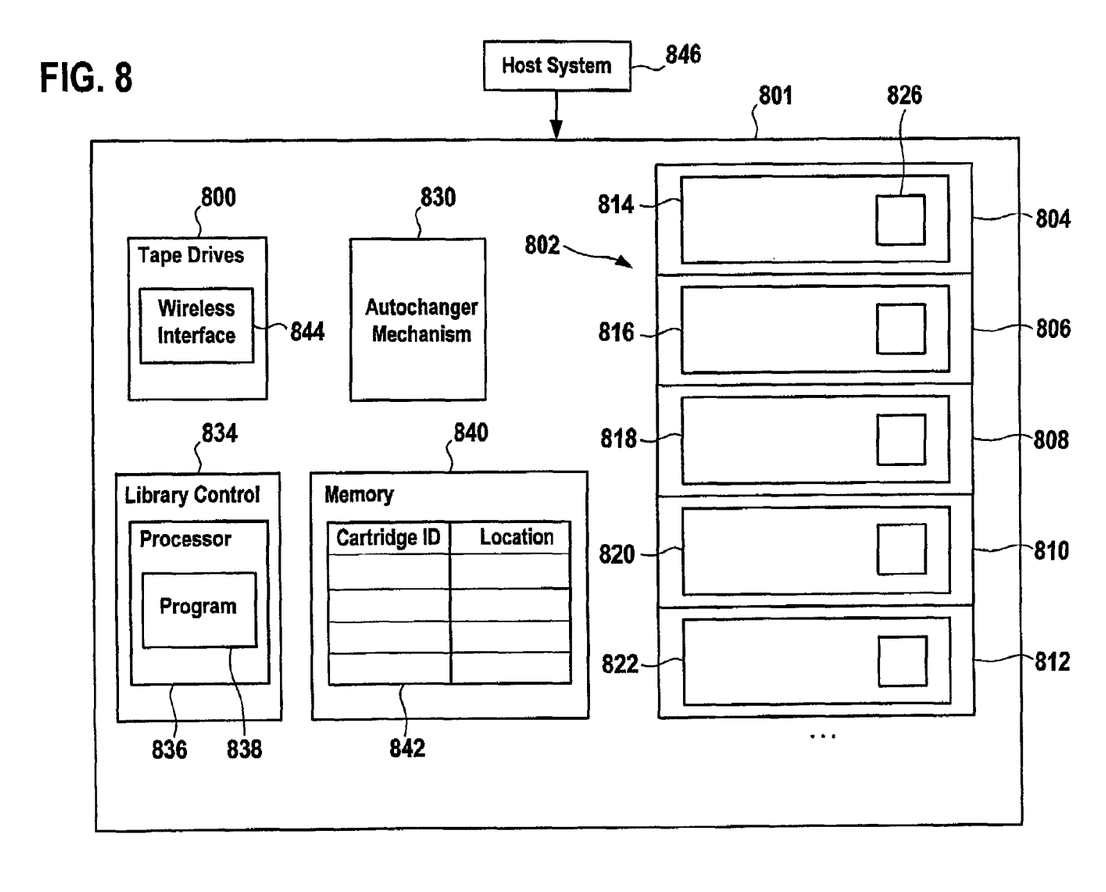

FIG. 8 shows a tape library 801 that has an array 802 of storage cells 804, 806, 808, 810, 812, . . . . Tape cartridges 814, 816, 118, 820, 822, . . . are stored in respective storage cells 804, 806, 808, 810, 812, . . . . Each one of the tape cartridges 814, 816, . . . is formatted into fragments. At least a sub-set of the fragments have header portions carrying at least components of an identifier of the respective tape cartridge.

Accessor 830 provides an autochanger mechanism for transportation of a selected one of the tape cartridges 814, 816, . . . between its storage cell and a tape drive unit 800. For example, accessor 830 includes a gripper for holding a cartridge. Operation of the accessor 830 and the tape drive unit 800 is controlled by a library controller 834. Library controller 834 has microprocessor 836 for running a computer program 838. The library controller 834 is coupled to a memory 840 for storage of a table 842 as well as for updating and reading data from the table 842. The table 842 provides a cartridge map that identifies a storage cell for each one of the loaded tape cartridges.

The tape drive unit 800 is of similar design as the tape drives 100 and 400 as shown in FIGS. 1 and 4, respectively. The host system 846 is coupled to the tape library 801 for storing backup data and/or for the purpose of data recovery.

In operation array 802 is loaded with tape cartridges 814, 816, 818, . . . . This can be done manually by an operator or by means of an input/output station that allows an operator to add or remove cartridges to the library 801 without opening a locking front door (not shown) of library 801.

Closing the locking front door invokes program 838 in order to perform an inventory of the library 801. The program 838 directs accessor 830 to sequentially move tape cartridges 814, 816, 818, . . . from the array 802 to the tape drive unit 800 in order to read the respective identifiers from the header portions of the respective fragments. The location of a tape cartridge in the array 802, i.e. its storage cell coordinates, together with the respective cartridge ID, i.e. the identifier of the tape medium, are entered into the table 842. After all tape cartridges loaded in the array 802 have been processed this way, the table 842 provides a complete cartridge map by identifying the storage cell of each loaded tape cartridge.

It is to be noted that the tape library 801 does not require barcode labels on the tape cartridges. This has the advantage that no optical bar code label reader is required. Another advantage is increased reliability and reduced system downtime in comparison to prior art tape libraries that rely on barcode labels. This is due to the fact that the storage of the cartridge IDs as part of the tape formatting information is not subject to the mechanical wear and tear to which the prior art barcode labels are subject.

This embodiment of the present invention is particularly advantageous as storage of the unique information storage element identifiers on the removable information storage elements avoids a need for an optical bar code reader for reading of bar code labels attached to the removable information storage elements. Using the removable information storage elements themselves, rather than bar code labels, has the further advantage that the mechanical wear and tear to which the prior art bar code labels are subject to is avoided. This way operation of the library is more reliable as interruptions which occur in prior art library systems when a bar code label becomes unreadable or is lost can be eliminated.

The invention claimed is:

1. A library for storing and retrieving removable information storage elements, the removable information storage elements having format information comprising an information storage element identifier, the library comprising:
   an array of storage cells for storing the removable information storage elements,
   at least one drive for reading the format information from the removable information storage elements,
   an accessor for transporting the removable information storage elements between the storage cells and the at least one drive,
   a controller operable to:
   a) direct the accessor to move one of the removable information storage elements from its storage cell to the at least one drive,
   b) direct the drive to provide the format information comprising the information storage element identifier,
   c) enter the information storage element identifier into a cartridge map,
   wherein each of the removable storage elements is formatted into fragments, the controller being operable to create the information storage element identifier for a removable information storage element when the controller determines the removable information storage element to be unformatted, the information storage element identifier being used to format the removable storage element.

2. The library of claim 1 the controller operable to inventory the array by performing the steps (a) to (c) for all removable storage elements stored in the array.

3. The library of claim 1, wherein at least a subset of the fragments have header portions carrying at least components of the information storage element identifier of a respective removable storage element.

4. The library of claim 1, wherein the cartridge map identifies a storage cell for each one of the removable storage elements in the array.

5. The library of claim 1, wherein locking the library automatically invokes the accessor to move one of the removable information storage elements from its storage cell to the at least one drive to begin an inventory of the library by generating the cartridge map.

6. The library of claim 1, wherein the information storage element identifier and a location of the removable storage element in the array are entered in the cartridge map for each removable storage element in the array.

7. The library of claim 1, wherein the information storage element identifier is composed of a vendor identification number, a product identification number, a serial number, a cartridge format code, a cartridge pattern code, and a counter value.

8. A library controller for storing and retrieving removable information storage elements, the removable information storage elements having format information comprising an information storage element identifier, the library controller operable to:
   a) direct an accessor to move one of removable information storage elements from a storage cell in a library to at least one drive for reading the format information from the removable information storage element;
   b) direct the drive to provide the format information comprising the information storage element identifier,
   c) enter the information storage element identifier into a cartridge map,
   wherein each of the removable storage elements is formatted into fragments, the controller being operable to create the information storage element identifier for a removable information storage element when the controller determines the removable information storage element to be unformatted, the information storage element identifier being used to format the removable storage element.

9. The library controller of claim 8, wherein the controller is operable to inventory the array by performing the steps (a) to (c) for all removable storage elements stored in the array.

10. The library controller of claim 8, wherein at least a subset of the fragments have header portions carrying at least components of the information storage element identifier of a respective removable storage element.

11. The library controller of claim 8, wherein the cartridge map identifies a storage cell for each one of the removable storage elements in the array.

12. The library controller of claim 8, wherein the information storage element identifier and a location of the removable storage element in the array are entered in the cartridge map for each removable storage element in the array.

13. The library controller of claim 8, wherein the information storage element identifier is composed of a vendor identification number, a product identification number, a serial number, a cartridge format code, a cartridge pattern code, and a counter value.

14. A library for storing and retrieving removable information storage elements, the removable information storage elements having format information comprising an information storage element identifier, the library comprising:

an array of storage cells for storing the removable information storage elements, a controller operable to:

a) direct the accessor to move one of the removable information storage elements from its storage cell to at least one drive, b) direct the drive to provide the format information comprising the information storage element identifier, c) enter the information storage element identifier into a cartridge map, wherein each of the removable storage elements is formatted into fragments, the controller being operable to create the information storage element identifier for a removable information storage element when the controller determines the removable information storage element to be unformatted, the information storage element identifier being used to format the removable storage element.

15. The library of claim 14, wherein the controller is operable to inventory the array by performing the steps (a) to (c) for all removable storage elements stored in the array.

16. The library of claim 14, wherein at least a subset of the fragments have header portions carrying at least components of the information storage element identifier of a respective removable storage element.

17. The library of claim 14, wherein the cartridge map identifies a storage cell for each one of the removable storage elements in the array.

18. The library of claim 14, wherein locking the library automatically invokes the accessor to move one of the removable information storage elements from its storage cell to the at least one drive to begin an inventory of the library by generating the cartridge map.

19. The library of claim 14, wherein the information storage element identifier and a location of the removable storage element in the array are entered in the cartridge map for each removable storage element in the array.

20. The library controller of claim 14, wherein the information storage element identifier is composed of a vendor identification number, a product identification number, a serial number, a cartridge format code, a cartridge pattern code, and a counter value.

* * * * *